(12) United States Patent
Seo (10) Patent No.: US 10,470,228 B2
(45) Date of Patent: *Nov. 5, 2019

(54) METHOD FOR TRANSMITTING DEVICE-TO-DEVICE LINK SIGNAL BASED ON LOCATION OF UE IN WIRELESS COMMUNICATION SYSTEM AND APPARATUS THEREFOR

(71) Applicant: LG Electronics Inc., Seoul (KR)

(72) Inventor: Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,551

(22) Filed: Aug. 17, 2017

(65) Prior Publication Data

US 2017/0347386 A1 Nov. 30, 2017

Related U.S. Application Data

(63) Continuation of application No. 14/766,936, filed as application No. PCT/KR2014/001303 on Feb. 18, 2014, now Pat. No. 9,769,859.

(Continued)

(51) Int. Cl.
*H04W 76/14* (2018.01)
*H04L 5/14* (2006.01)
(Continued)

(52) U.S. Cl.
CPC ............... *H04W 76/14* (2018.02); *H04L 5/14* (2013.01); *H04W 8/005* (2013.01);
(Continued)

(58) Field of Classification Search
CPC ............. H04W 76/14; H04W 72/0413; H04W 72/042; H04W 8/005; H04W 88/08; H04L 5/14
See application file for complete search history.

(56) References Cited

U.S. PATENT DOCUMENTS 9,769,859 B2 * 9/2017 Seo ................... H04W 8/005
2009/0285119 A1 11/2009 Horn et al.
(Continued)

FOREIGN PATENT DOCUMENTS

| CN | 101690036 A | 3/2010 |
|---|---|---|
| CN | 102077622 A | 5/2011 |

(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 11), 3GPP TS 36.211 V11.0.0, Sep. 2012.

(Continued)

*Primary Examiner* — Omar J Ghowrwal (74) *Attorney, Agent, or Firm* — Dentons US LLP (57) ABSTRACT

A method for performing device-to-device (D2D) communication by a user equipment in a wireless communication system is disclosed in the present application. More particularly, the method comprises the steps of: receiving a discovery signal from a counterpart user equipment (UE); identifying at least one of information indicating whether the counterpart UE is located within the coverage area of a base station and information indicating whether the counterpart UE is in a connected mode or in an idle mode, all of which are included in the discovery signal; and performing the D2D communication with the counterpart UE by using the at least one identified pierce of information.

8 Claims, 9 Drawing Sheets eNB

UE 1

UE 2

Related U.S. Application Data (60) Provisional application No. 61/769,720, filed on Feb. 26, 2013.

(51) Int. Cl.
*H04W 72/04* (2009.01)
*H04W 8/00* (2009.01)
*H04W 88/08* (2009.01)

(52) U.S. Cl.
CPC ..... *H04W 72/042* (2013.01); *H04W 72/0413* (2013.01); *H04W 88/08* (2013.01)

(56) References Cited

U.S. PATENT DOCUMENTS

| | | | |
|---|---|---|---|
| 2011/0126231 A1* | 5/2011 | Ko | H04N 5/4403 725/39 |
| 2011/0268101 A1 | 11/2011 | Wang et al. | |
| 2012/0044815 A1 | 2/2012 | Geirhofer et al. | |
| 2012/0106381 A1 | 5/2012 | Vedantham et al. | |
| 2013/0223257 A1* | 8/2013 | Balercia | H04B 7/15557 370/252 |
| 2015/0036519 A1 | 2/2015 | Kazmi | H04L 5/00 370/252 |
| 2015/0249937 A1 | 9/2015 | Lindoff | H04W 76/023 370/331 |
| 2017/0013595 A1* | 1/2017 | Jung | H04W 72/02 |

FOREIGN PATENT DOCUMENTS

| | | |
|---|---|---|
| KR | 10-2009-0086574 A | 8/2009 |
| KR | 10-2011-0018915 A | 2/2011 |
| KR | 10-2011-0036087 A | 4/2011 |
| RU | 2010151988 A | 6/2012 |
| RU | 2480948 C2 | 4/2013 |
| WO | 2011130630 A1 | 10/2011 |
| WO | 2012082024 A1 | 6/2012 |
| WO | 2013-025040 A2 | 2/2013 |

OTHER PUBLICATIONS

ZTE: "Evaluation methodology for D2D discovery", 3GPP TSG-RAN WG1 Meeting #72, R1-130133, Jan. 28-Feb. 1, 2013.

LG Electronics: "Considerations for D2D Proximity Services Evaluation", 3GPP TSG RAN WG1 Meeting #72, R1-130217, Jan. 28-Feb. 1, 2013.

Specification of the Bluetooth System [online]. Version 1.1. Feb. 22, 2001 [retrieved Sep. 7, 2016]. Retrieved from the Internet: <URL: https://www.inf.ethz.ch/personal/hvogt/proj/btmp3/Datasheets/Bluetooth_11_Specifications_Book.pdf> pp. 1-199.

LG Electronics: "Considerations for D2D Proximity Services Evaluation," 3GPP TSG RAN WG1 Meeting #72, Jan. 28-Feb. 1, 2013, R1-130271.

\* cited by examiner

(a) control plane protocol stack (b) user plane protocol stack

METHOD FOR TRANSMITTING DEVICE-TO-DEVICE LINK SIGNAL BASED ON LOCATION OF UE IN WIRELESS COMMUNICATION SYSTEM AND APPARATUS THEREFOR

This application is a continuation of application Ser. No. 14/766,936 filed on Aug. 10, 2015, which claims the benefit of 35 U.S.C. § 371 National Stage Entry of International Application No. PCT/KR2014/001303 filed on Feb. 18, 2014 and claims the benefit of U.S. Provisional Application No. 61/769,720 filed on Feb. 26, 2013, all of which are incorporated by reference in their entirety herein.

TECHNICAL FIELD

The present invention relates to a wireless communication system and, more particularly, to a method and apparatus for transmitting and receiving a discovery signal for device-to-device (D2D) communication in a wireless communication system.

BACKGROUND ART

3GPP LTE (3rd generation partnership project long term evolution hereinafter abbreviated LTE) communication system is schematically explained as an example of a wireless communication system to which the present invention is applicable.

Figure 1:
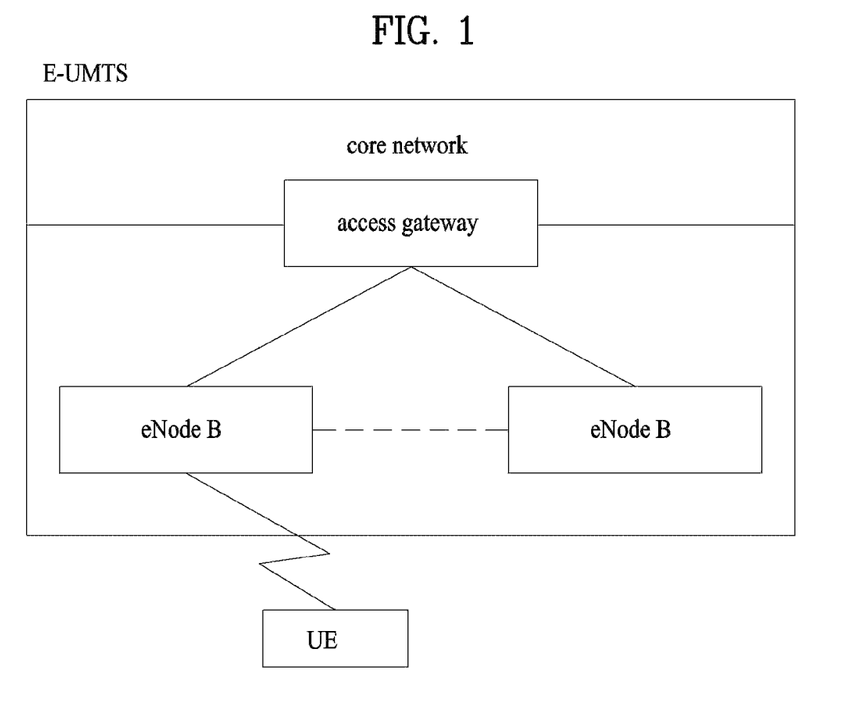
FIG. 1 is a diagram showing a network structure of an Evolved Universal Mobile Telecommunications System (E-UMTS) as an example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for transmitting and receiving a discovery signal for device-to-device (D2D) communication in a wireless communication system.

Technical Solution

The object of the present invention can be achieved by providing a method of performing device-to-device (D2D) communication at a user equipment (UE) in a wireless communication system including receiving a discovery signal from a counterpart UE, identifying at least one of information as to whether the counterpart UE is located within coverage of a base station and information as to whether the counterpart UE is in a connected mode or in an idle mode, all of which are included in the discovery signal, and performing D2D communication with the counterpart UE using the at least one piece of information.

The performing D2D communication may include stopping D2D communication in a communication duration between the counterpart UE and the base station, when the counterpart UE is located within the coverage of the base station and is in the connected mode.

The performing D2D communication may include transmitting, to the base station, a D2D communication request signal for requesting that the base station assign resources for D2D communication to the counterpart UE, when the counterpart UE is located within the coverage of the base station and is in the connected mode. When the counterpart UE is located within the coverage of the base station and is in the idle mode, the counterpart UE may be switched to the connected mode within a predetermined time and transmits the D2D communication request signal to the base station.

When the counterpart UE is located within the coverage of the base station or is in the connected mode, the discovery signal may include an identifier of a network connected with the counterpart UE.

In another aspect of the present invention, provided herein is a user equipment (UE) apparatus for performing device-to-device (D2D) communication in a wireless communication system including a wireless communication module configured to transmit and receive a signal to and from a base station or a counterpart UE apparatus of D2D communication, and a processor configured to process the signal, wherein the processor controls the wireless communication module to identify at least one of information as to whether the counterpart UE apparatus is located within coverage of the base station and information as to whether the counterpart UE apparatus is in a connected mode or in an idle mode, all of which are included in the discovery signal received from the counterpart UE apparatus and to perform D2D communication with the counterpart UE apparatus using the at least one piece of information.

The processor may control the wireless communication module to stop D2D communication in a communication duration between the counterpart UE apparatus and the base station, when the counterpart UE apparatus is located within the coverage of the base station and is in the connected mode.

The processor may control the wireless communication module to transmit, to the base station, a D2D communication request signal for requesting that the base station assign resources for D2D communication to the counterpart UE apparatus, when the counterpart UE apparatus is located within the coverage of the base station and is in the connected mode. When the counterpart UE apparatus is located within the coverage of the base station and is in the idle mode, the counterpart UE apparatus may be switched to the connected mode within a predetermined time and transmit the D2D communication request signal to the base station.

Advantageous Effects

According to embodiments of the present invention, it is possible to more efficiently transmit a discovery signal for device-to-device (D2D) communication in a wireless communication system It will be appreciated by persons skilled in the art that that the effects that can be achieved through the present invention are not limited to what has been particularly described hereinabove and other advantages of the present invention will be more clearly understood from the following detailed description.

BEST MODE

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 2:
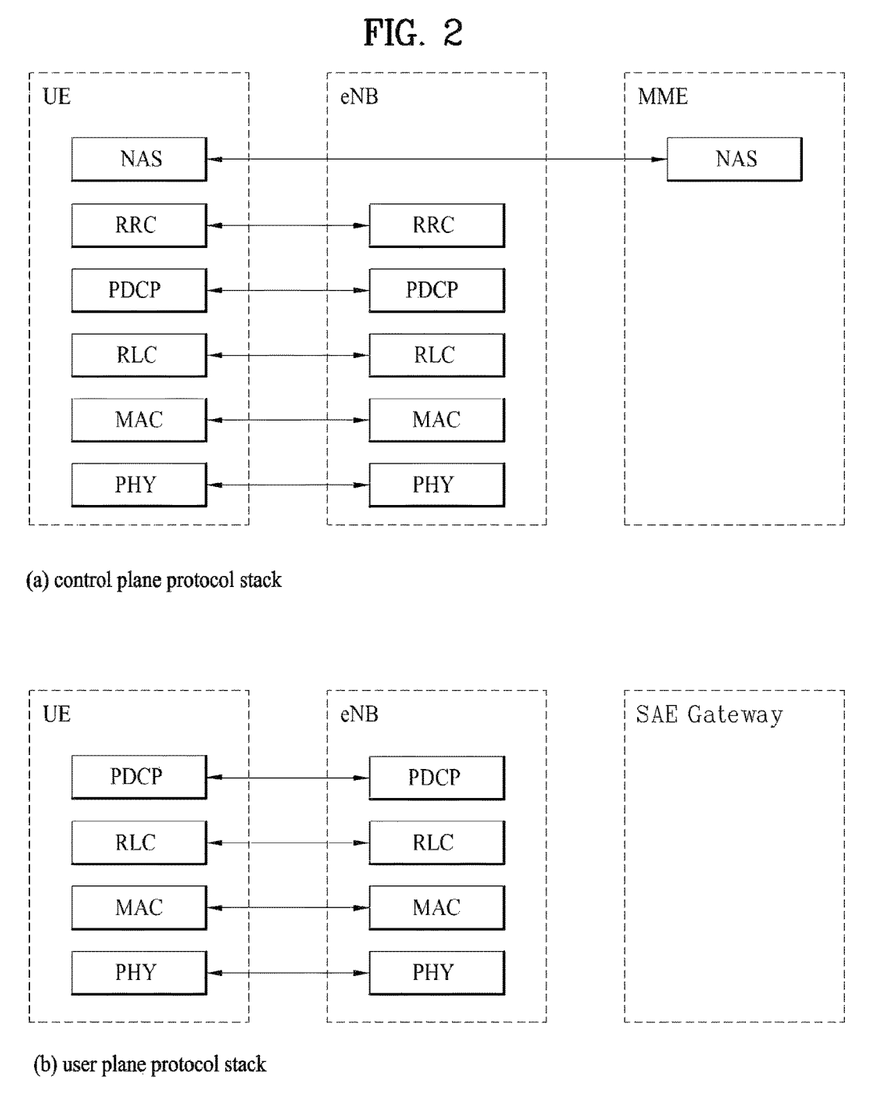
FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
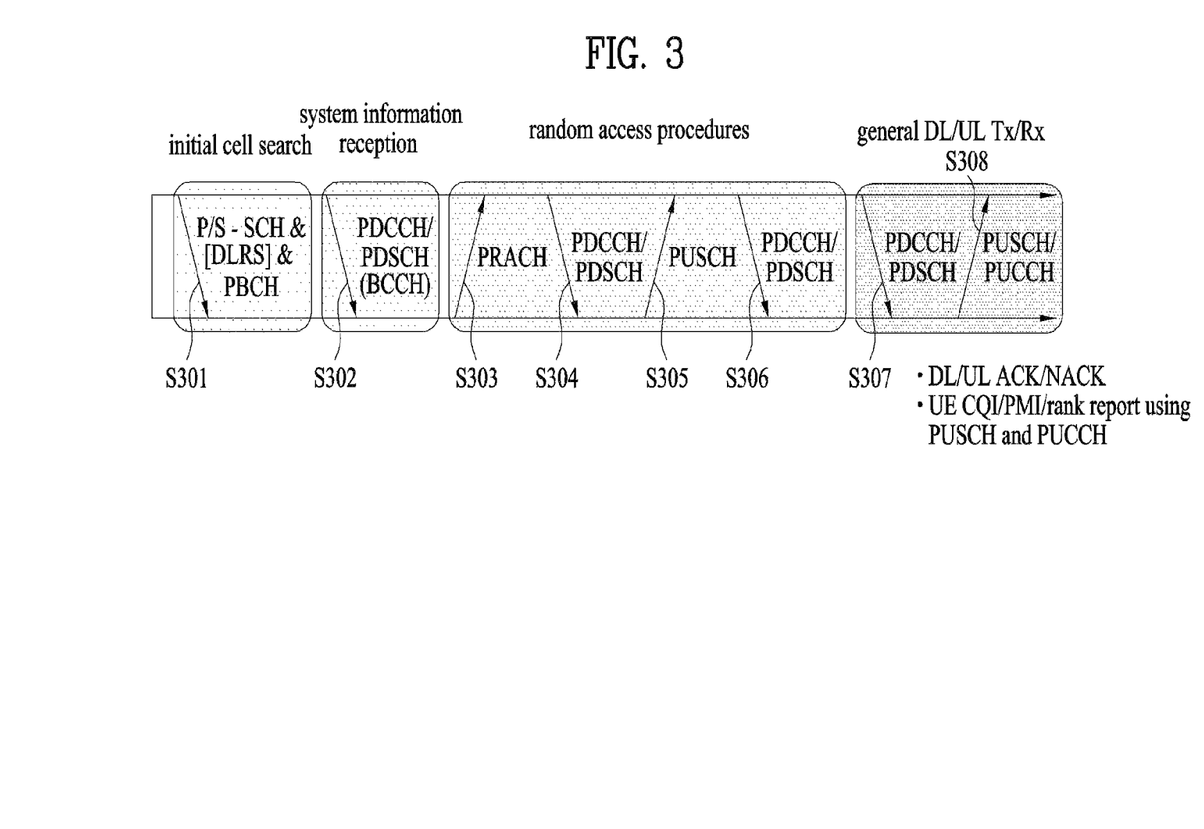
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
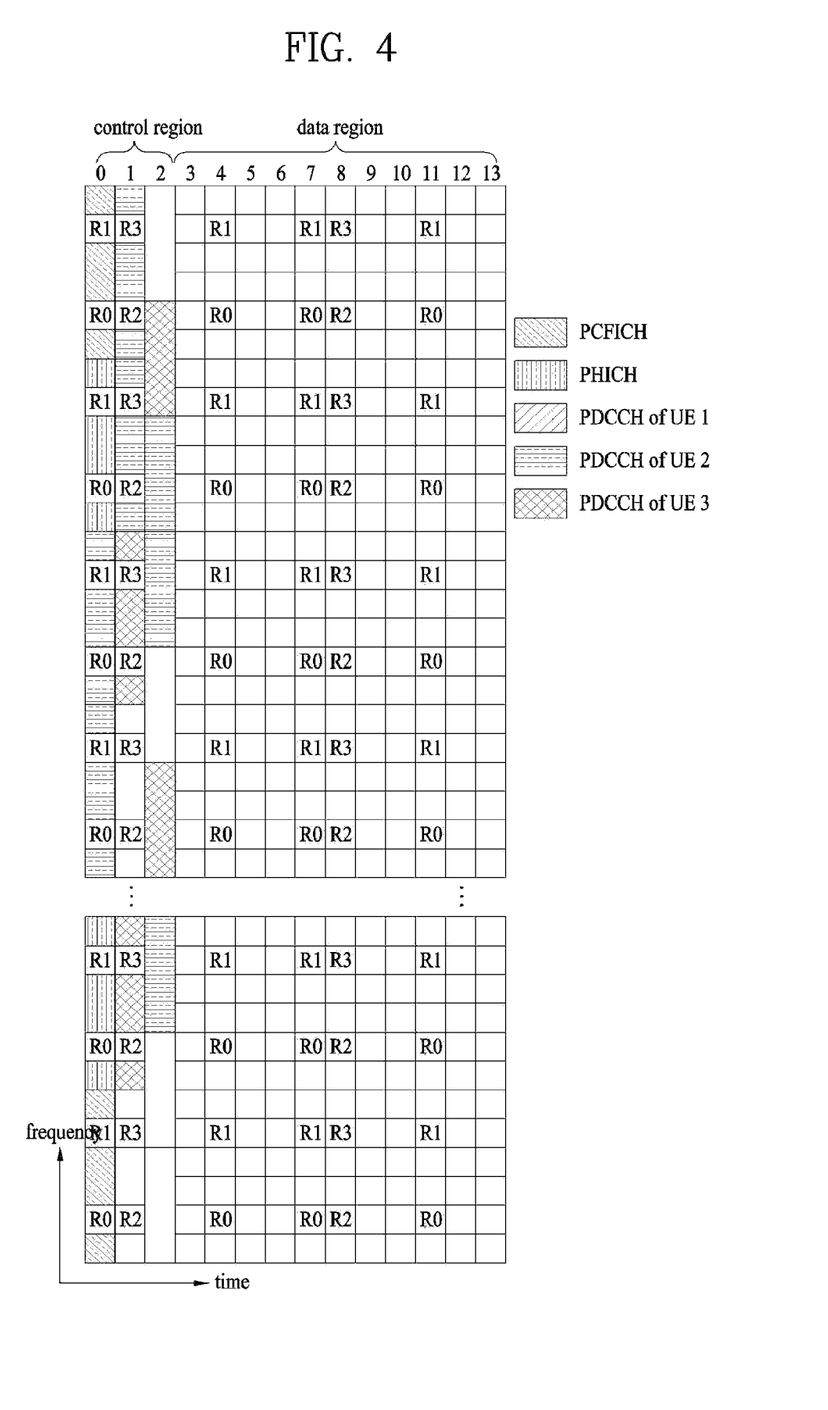
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
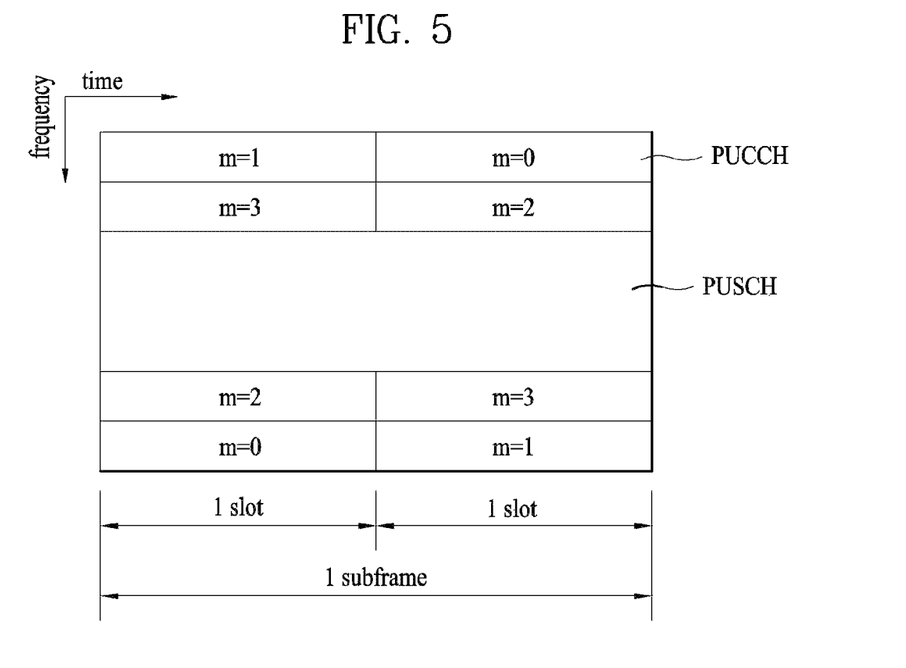
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A basic resource unit of a DL control channel is an REG. The REG includes four contiguous REs except for REs carrying RSs. A PCFICH and a PHICH include 4 REGs and 3 REGs, respectively. A PDCCH is configured in units of a Control Channel Element (CCE), each CCE including 9 REGs.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
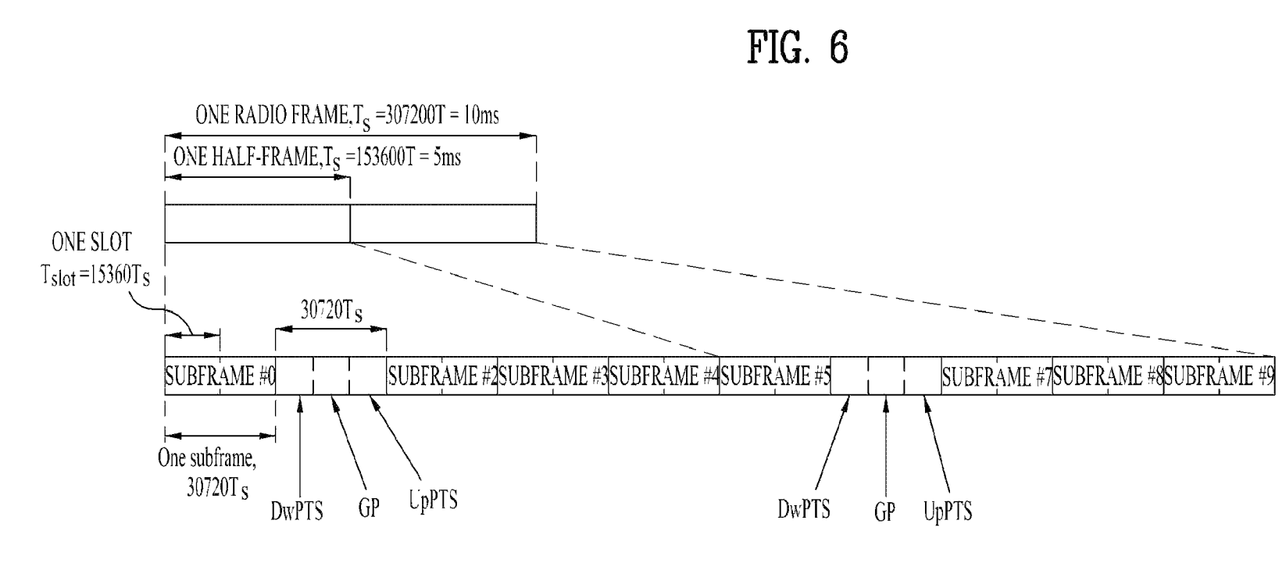
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Currently, in an LTE TDD system, the special subframe is configured as a total of 10 configurations as shown in Table 1 below.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Meanwhile, in an LTE TDD system, a UL/DL configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, D, U, and S refer to a downlink subframe, an uplink subframe, and the special subframe. In addition, Table 2 also shows downlink-to-uplink switch-point periodicity in an uplink/downlink subframe configuration in each system.

Figure 7:
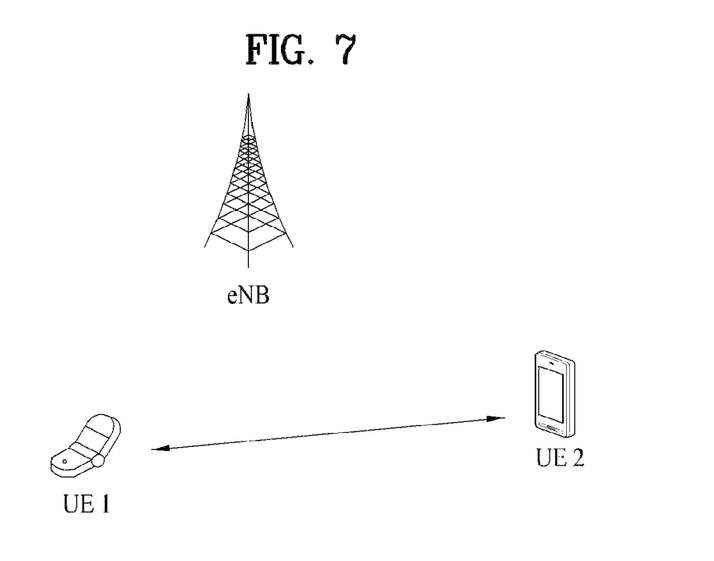
FIG. 7 is a diagram illustrating the concept of device-to-device (D2D) communication.

FIG. 7 shows the concept of D2D communication.

Referring to FIG. 7, in device-to-device (D2D) communication in which a UE directly performs communication with another UE, an eNB may transmit a scheduling message indicating D2D transmission and reception. A UE participating in D2D communication receives the D2D scheduling message from the eNB and performs transmission and reception operation indicated by the D2D scheduling message. Here, the UE means a user terminal and a network entity such as an eNB may also be regarded as a UE when the network entity transmits and receives a signal according to a communication method between UEs. Hereinafter, a link between UEs is referred to as a D2D link and a link between a UE and an eNB is referred to as an NU link.

For D2D operation, a UE performs a discovery procedure of determining whether a counterpart UE of D2D communication is located in a D2D communication area. Such a discovery procedure includes transmitting a unique discovery signal for identifying each UE and determining that the UE, which has transmitted the discovery signal, is located at a neighboring position when a neighboring UE detects the discovery signal. That is, each UE determines whether a counterpart UE of D2D communication is located at a neighboring position via the discovery procedure and then performs D2D communication for transmitting and receiving user data.

D2D discovery and D2D communication may be performed between UEs, which are connected to an eNB in eNB coverage to perform communication, and between UEs located outside eNB coverage without connection to the eNB. Additionally, one of two UEs connected via one D2D link may be located within eNB coverage and the other UE may be located outside eNB coverage. That is, D2D discovery and D2D communication may be performed between a UE located within eNB coverage and a UE located outside eNB coverage.

Whether a UE is located within eNB coverage may be determined using reception quality of a reference signal transmitted by an eNB. More specifically, when the reference signal received power (RSRP) or reference signal received quality (RSRQ) of a reference signal of an arbitrary eNB measured by a UE is equal to or less than a predetermined level, it may be determined that the UE is located outside eNB coverage.

The UE located within eNB coverage may be divided into a UE in an idle mode and a UE in a connected mode. The UE in the connected mode means a UE for currently transmitting and receiving data to and from the eNB or a UE which can start data transmission and reception to and from the eNB via scheduling of the eNB. In contrast, the UE in the idle mode means a UE which is located within eNB coverage but does not currently perform data transmission and reception to and from the eNB and should be switched to the connected mode via a process of connecting the UE and the eNB in order to transmit and receive data between the UE and the eNB.

The UE in the connected mode should maintain an NU link for performing communication with the eNB and a D2D link for performing communication with another UE. For example, the NU link may operate using a series of time resources and the D2D link may operate using other time resources. In other words, the UE in the connected mode has restraints on time resources for performing D2D operation.

In contrast, the UE in the idle mode does not need to always perform communication with the eNB but should periodically receive paging indicating that there is data traffic from the eNB. Accordingly, the UE in the idle mode has restraints on time resources for performing D2D operation, similarly to the UE in the connected mode and the total time resources may be divided into resources for the NU link and resources for the D2D link. Resources used to transmit paging at the eNB and resources used to perform D2D operation at the UE are distinguished in terms of frequency and, when the UE can receive a signal from the eNB and, at the same time, can perform D2D operation using different frequency resources, D2D communication may be performed using all time resources without distinguishing between operations of the two links in terms of time.

As described above, the UE finds the counterpart UE of D2D communication via the discovery procedure and then attempts D2D communication with the counterpart UE. At this time, when the counterpart UE is located within eNB coverage and performs NU link communication using predetermined time resources, the UE cannot perform D2D communication with the counterpart UE while the counterpart UE performs NU link communication. Accordingly, such time resources are not used for D2D communication, thereby reducing unnecessary power consumption. When the counterpart UE is located outside eNB coverage or when the counterpart UE is located within eNB coverage but restraints on time resources used to transmit and receive a D2D signal are not imposed, D2D communication is efficiently performed using as many time resources as possible.

In order to appropriately select time resources used for D2D communication depending on whether the counterpart UE is located within eNB coverage or whether the counterpart UE is connected to the network, the present invention proposes use of network related information when the UE generates, transmits and receives the discovery signal.

Figure 8:
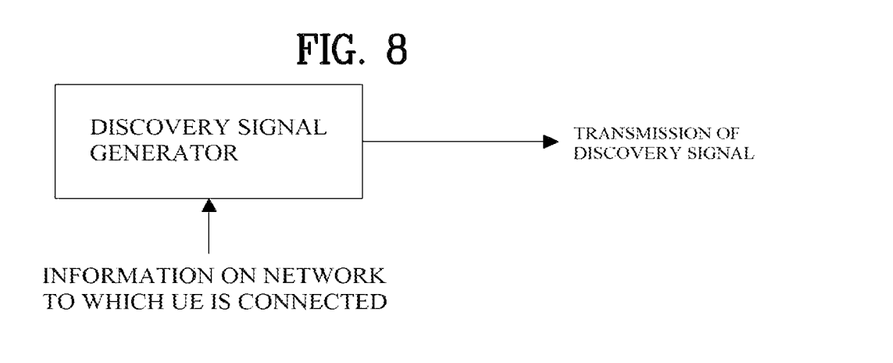
FIG. 8 is a diagram showing an example of generating a D2D discovery signal according to an embodiment of the present invention.

FIG. 8 is a diagram showing an example of generating a D2D discovery signal according to an embodiment of the present invention. Referring to FIG. 8, information on a network, to which a UE is connected, is applied as a variable used to generate a D2D discovery signal.

Hereinafter, a detailed example of generating and transmitting a discovery signal at a UE according to the present invention will be described.

First, a variable applied when each UE generates a discovery signal may include whether each UE is located within eNB coverage. That is, even in the same UE, the sequence, time/frequency resources, transmit power, etc. of a discovery signal are changed depending on whether the UE is located within or outside eNB coverage. For example, when the sequence of the discovery signal is generated, bits 0 and 1 may be respectively applied as values for initializing a sequence generator when the UE is located within and outside eNB coverage.

Alternatively, as a method of providing additional information, a variable used to generate a discovery signal at each UE may include whether each UE is in the connected mode. For example, when the UE generates the discovery signal, whether the UE is in the connected mode may be used instead of whether the UE is located within eNB coverage. This method is suitable when restraints on time resources used for D2D operations are not imposed because the UE is in the idle mode although the UE is located within coverage. That is, the UE which is located within coverage and is in the idle mode and the UE located outside coverage are not distinguished.

Operation for not distinguishing the UE which is located within coverage and is in the idle mode and the UE located outside coverage is suitable when the UE in the idle mode performs eNB signal reception operation via resources separated from those of D2D operation in the frequency domain, e.g., when a signal is received from the eNB in a downlink band and D2D operation is performed in an uplink band in an FDD system. This is because D2D signal transmission and reception in the uplink band does not have influence on eNB signal reception.

As another example, the UE located within coverage may use information as to whether the UE is in the connected mode or in the idle mode, when generating the discovery signal, in addition to information indicating that the UE is located within eNB coverage. This method is suitable when the UE which is located within coverage and is in the idle mode has restraints on time resources used for D2D operation. Operation for distinguishing between the UE which is located within coverage and is in the idle mode and the UE located outside coverage is suitable when the UE in the idle mode performs eNB signal reception operation and D2D operation in the same frequency domain, e.g., when the eNB signal is received via a downlink subframe of a TDD system and D2D operation is performed via an uplink subframe. This is because D2D signal transmission in the frequency band of the TDD system may cause interference with eNB signal reception in the same frequency band.

When the above-described examples are used, information used to generate the discovery signal may be changed according to a duplex mode of the UE. For example, whether the UE is in the connected mode may be used in the FDD system and whether the UE is located within eNB coverage may be used in the TDD system.

According to the above-described method of generating the discovery signal, each UE may determine whether the counterpart UE of D2D communication is located within eNB coverage and/or is in the connected mode. Based on this information, the UE may perform appropriate operation suitable for the state of the counterpart UE when starting D2D communication.

For example, when it is determined that predetermined time resources are not used for D2D communication because the counterpart UE is located within coverage or is in the connected mode, the UE may not perform D2D operation via those resources but may transmit D2D signal to the counterpart UE using the other time resources. When restraints on the time resources for D2D communication are not imposed because the counterpart UE is located outside eNB coverage or is in the idle mode, the UE may transmit the D2D signal to the counterpart UE using arbitrary time resources.

Figure 9:
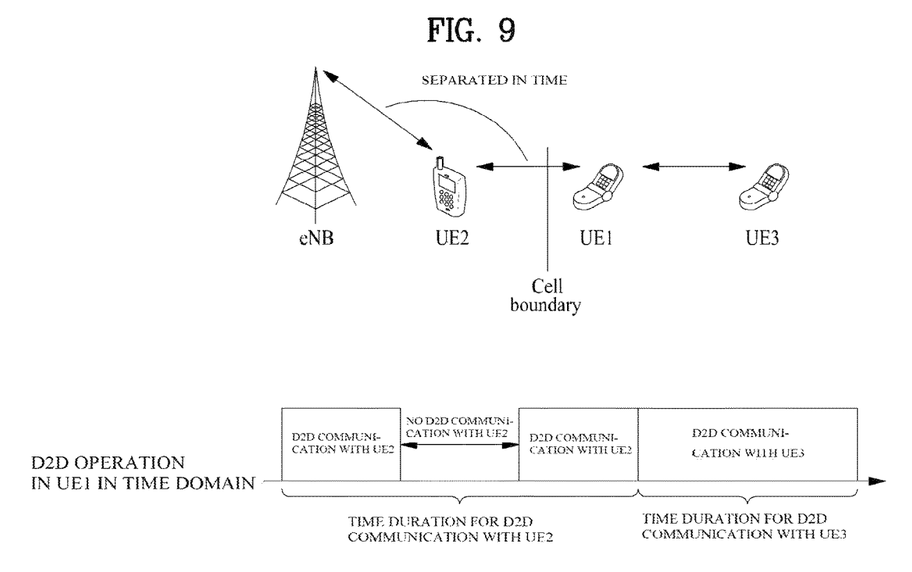
FIG. 9 is a diagram showing an example of performing D2D communication according to an embodiment of the present invention.

FIG. 9 is a diagram showing an example of performing D2D communication according to an embodiment of the present invention. In particular, in FIG. 9, UE1 performs D2D communication with UE2 and UE3, UE2 has restraints on D2D time resources and UE3 does not have restraints on D2D time resources.

Although not shown in FIG. 9, in a TDD system, in time resources having restraints on D2D communication with UE2, D2D signal communication may be restricted in order to protect the NU link operation of UE2. Alternatively, in an FDD system, since D2D signal transmission to UE2 is impossible but the signal does not have influence on the NU link operation of UE2, the D2D signal may be transmitted to the UE without restraints, such as UE3.

Referring to FIG. 9, UE1 may perform D2D communication with another UE without restraints via resources, in which D2D communication with UE2 is restricted, with lower transmit power, e.g., transmit power obtained by subtracting a predetermined offset from general D2D transmit power or maximum transmit power less than maximum power of general D2D transmission, while protecting the NU link operation of UE2.

In addition, when it is determined that an instruction of the eNB is necessary for D2D communication because the counterpart UE is located within eNB coverage or is in the connected mode, the UE may transmit a D2D communication request signal to the eNB. That is, the UE transmits a D2D communication request signal to the eNB and enables the eNB to assign resources to perform D2D operation with the counterpart UE using predetermined time resources. This is referred to as a first D2D communication method. In contrast, the UE which is located within eNB coverage and is in the idle mode may perform D2D communication while maintaining the idle mode without the direct instruction of the eNB (this is referred to as a second D2D communication method and the same is true even when the UE is located outside eNB coverage) or the UE in the idle mode may not perform D2D communication but may always perform D2D communication according to the direct instruction of the eNB after being switched to the connected mode.

D2D request signal may include the identifier of the counterpart UE, the communication state of the UE, the quality of the discovery signal of the detected counterpart UE, the amount of resources necessary for D2D communication, etc. Since the request for D2D communication from the eNB may be made only when the UE is in the connected mode, the UE which is located within eNB coverage and is in the idle mode may transmit the D2D communication request signal after being switched to the connected mode.

When the UE is located outside eNB coverage, the UE cannot request D2D communication from the eNB. Therefore, the UE may directly request D2D communication from the counterpart UE or wait until the counterpart UE starts D2D communication. In particular, when the counterpart UE is located within eNB coverage or is in the connected mode, the UE may wait until the counterpart UE starts D2D communication without interfering with NU link communication.

When the UE waits until the counterpart UE starts D2D communication, a timer may be set and the UE waits until the timer ends. When the UE does not start D2D communication before the timer ends, the UE may directly attempt D2D communication with the counterpart UE or abandon D2D communication with the counterpart UE and attempt communication with another UE.

In addition, when it is determined that the instruction of the eNB is unnecessary for D2D communication because the counterpart UE is located outside coverage or is in the idle mode, the UE may directly start D2D communication with the counterpart UE. This is referred to as a second D2D communication method. When information on the idle mode is included in the discovery signal, one of the first communication method and the second communication method may be selected.

In the above cases, operation for preparing D2D signal reception at the counterpart UE may be changed according to the state of the counterpart UE.

When the instruction of the eNB is necessary for D2D communication because the counterpart UE is located within eNB coverage or is in the connected mode, the counterpart UE may not prepare D2D communication with the UE until the instruction of the eNB is received, thereby reducing unnecessary power consumption. In contrast, when the instruction of the eNB is unnecessary for D2D communication because the counterpart UE is located outside eNB coverage or is in the idle mode, D2D communication with the UE should be prepared via arbitrary resources, in which D2D communication is possible, such that the UE can directly start D2D communication.

As another example of information used to generate, transmit and receive the discovery signal, attribute information of a network, to which the UE belongs to, may be included in the case of the UE located within coverage or the UE in the connected mode. Using this information, a counterpart D2D UE located outside eNB coverage or located in another cell may determine the attribute of each UE upon NU link operation via the discovery procedure.

As an example of information on a network used to generate, transmit and receive discovery signal, the ID of a network, to which each UE belongs, may be included as information used to generate, transmit and receive the discovery signal. The ID of the network may be the ID of a cell, to which the network belongs, the ID of a public land mobile network (PLMN) or the ID of a cell cluster composed of a series of cells.

More specifically, the cell cluster may be set equally to a paging group or a tracking area which is a criterion for updating the position of the UE when the UE moving in the idle mode or a group of cells in which D2D communication is possible may be a separately defined D2D cell cluster. Cells belong to one D2D cell cluster are time synchronized and may exchange a signal via a backhaul link.

Each UE may identify network information of the counterpart UE and perform appropriate D2D communication. For example, when the counterpart UE belongs to the same cell or the same D2D cell cluster, the UE determines that operation or scheduling of the network in which mutual D2D communication is performed is possible and performs a series of processes for D2D communication. In contrast, when it is determined that the counterpart UE belongs to a different cell or a different D2D cell cluster, the UE may determine that operation of the network for D2D communication between UEs is impossible and may not perform D2D communication.

As another example, when the counterpart UE belongs to the same cell or the same D2D cell cluster, the UE determines that mutual D2D communication may be performed without the instruction of the network and immediately performs D2D communication. In contrast, when it is determined that the counterpart UE belongs to a different cell or a different D2D cell cluster, the UE may determine that D2D communication between the UEs requires an appropriate advance preparation process of the network, transmit D2D request information to the eNB and perform D2D communication according to the instruction of the eNB.

As another example, when the counterpart UE belongs to the same cell or the same D2D cell cluster, the UE determines that two UEs belonging to the D2D link can be controlled by one controller and performs D2D communication according to the direct instruction of the eNB. In contrasts, when it is determined that the counterpart UE belongs to a different cell or a different D2D cell cluster, the UE determines that the UEs cannot be controlled by the controller of the network and performs the same procedure as performing D2D communication with the UE located outside coverage. For example, D2D communication may be performed without transmission of D2D communication request information to the eNB or without the direct instruction of the eNB.

The network divides D2D resources into a plurality of resources in advance, that is, resources for D2D with the UE belonging to the same cell or (or the same D2D cell cluster), resources for D2D with the UE belonging to a different cell (or a difference D2D cell cluster) and/or resources for D2D with the UE located outside coverage, and enables each UE to select appropriate resources according to the state of the counterpart UE.

Parameters for transmit power of D2D communication may be divided into D2D communication with the UE belonging to the same cell or (or the same D2D cell cluster), D2D communication with the UE belonging to a different cell (or a different D2D cell cluster) and/or D2D communication with the UE located outside coverage and enables each UE to select appropriate resources according to the state of the counterpart UE.

As an example of other information used to generate, transmit and receive the discovery signal, information on the location and amount of resources used or likely to be used by the UE as the NU link may be included. That is, information as to how many resources are used or where resources used for D2D communication are located may be used to generate, transmit and receive the discovery signal. Each UE notifies the counterpart UE of resources in which D2D communication is possible and enables the counterpart UE to identify a location where D2D communication may be performed, thereby reducing unnecessary interference and power consumption due to communication performed at a location where D2D communication is impossible.

Figure 10:
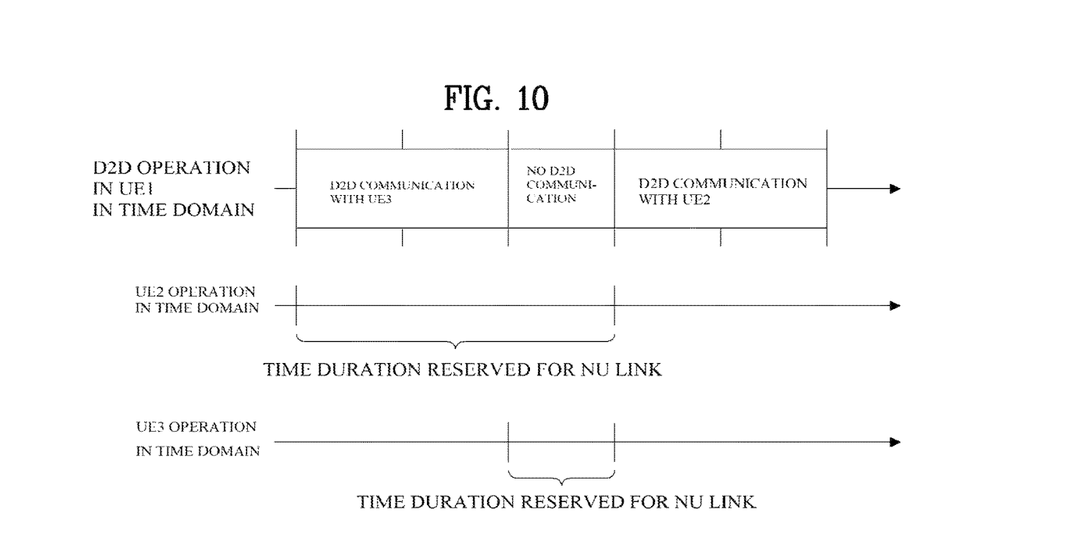
FIG. 10 is a diagram showing another example of performing D2D communication according to an embodiment of the present invention.
Figure 11:
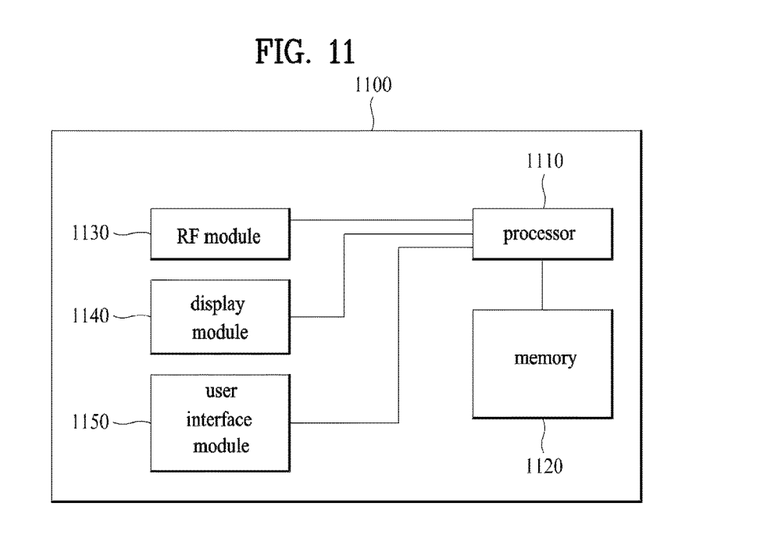
FIG. 11 is a block diagram of a communication apparatus according to an embodiment of the present invention.

FIG. 10 is a diagram showing another example of performing D2D communication according to an embodiment of the present invention.

Referring to FIG. 10, UE1 identifies that UE2 uses three NU links among five time domains and UE3 uses one NU link among five time domains, before performing D2D communication with UE2 and UE3 and performs D2D communication using the time domains in which D2D communication is possible.

In particular, the eNB may determine and send which resources are used for D2D communication and are used to generate the discovery signal to the UE via a higher layer signal such as radio resource control (RRC) or system information.

In an FDD system, since the UE in the idle mode receives only the downlink signal from the eNB and does not have restraints on D2D communication in the uplink band, the counterpart UE may be informed that all time resources are used for D2D communication. In contrast, in a TDD system, the UE may use uplink/downlink configuration information used by the cell, to which the UE belongs, in order to enable the counterpart UE located in another cell or located outside coverage to identify a domain for receiving the downlink signal transmitted by the eNB and prevent interference with reception of the downlink signal.

INDUSTRIAL APPLICABILITY

Although an example in which a method and apparatus for transmitting and receiving a discover signal for D2D communication in a wireless communication system is applied to a 3GPP LTE system is described, the present invention is applicable to various wireless communication systems in addition to the 3GPP LTE system.

The invention claimed is:

1. A method for transmitting a Device-to-Device (D2D) link signal at a user equipment (UE) in a wireless communication system, the method comprising;
   determining whether a location of the UE is within a coverage area of a serving cell or not;
   generating a D2D link control signal using a result of the determination; and selecting time resources used for D2D link signal based on whether a counterpart UE is located within coverage of an eNode B (eNB) or not;

transmitting, to the counterpart UE, the D2D link control signal, wherein the result of the determination is used for generating the D2D link control signal regardless of whether the location of the UE is within the coverage area or not, wherein, when the counterpart UE is located within the coverage of the eNB and performs a communication with the eNB, the UE does not transmit the D2D link signal to the counterpart UE while the counterpart UE performs the communication with the eNB, and wherein, when the counterpart UE is not located within the coverage of the eNB, the UE transmits the D2D link signal to the counterpart UE.

2. The method of claim 1, further comprising:

transmitting and receiving a D2D link data signal, based on the result of the determination, with the counterpart UE.

3. The method of claim 2, wherein the D2D link control signal is transmitted before the D2D link data signal.

4. The method of claim 1, wherein the D2D link control signal is generated using both the result of the determination and an indicator indicating an uplink/downlink (UL/DL) subframe configuration which is applied to the serving cell.

5. A user equipment (UE) in a wireless communication system, the UE comprising;

a transmitter and receiver; and a processor configured to determine whether a location of the UE is within a coverage area of a serving cell or not, generate a Device-to-Device (D2D) link control signal using a result of the determination, select time resources used for the D2D link signal based on whether a counterpart UE is located within coverage of an eNode B (eNB) or not, and control the transmitter to transmit the D2D link control signal to the counterpart UE, wherein the result of the determination is used for generating the D2D link control signal regardless of whether the location of the UE is within the coverage area or not, wherein, when the counterpart UE is located within the coverage of the eNB and performs a communication with the eNB, the processor is configured not to transmit the D2D link signal to the counterpart UE while the counterpart UE performs the communication with the eNB, and wherein, when the counterpart UE is not located within the coverage of the eNB, the processor is configured to transmit the D2D link signal to the counterpart UE.

6. The UE of claim 5, wherein the processor is further configured to control the transmitter and receiver to respectively transmit and receive a D2D link data signal, based on the result of the determination, with the counterpart UE.

7. The UE of claim 6, wherein the D2D link control signal is transmitted before the D2D link data signal.

8. The UE of claim 5, wherein the D2D link control signal is generated using both the result of the determination and an indicator indicating an uplink/downlink (UL/DL) subframe configuration which is applied to the serving cell.

* * * * *